United States Patent
Nakashima et al.

(10) Patent No.: US 7,630,116 B2
(45) Date of Patent: Dec. 8, 2009

(54) ION CONDUCTOR AND ELECTROCHEMICAL DISPLAY DEVICE UTILIZING THE SAME

(75) Inventors: Michiya Nakashima, Chiba (JP); Toshihiro Ebine, Ichikawa (JP); Kazunari Kawai, Yachiyo (JP); Naohito Saito, Sakura (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 140 days.

(21) Appl. No.: 10/597,222

(22) PCT Filed: Jan. 21, 2005

(86) PCT No.: PCT/JP2005/000749

§ 371 (c)(1), (2), (4) Date: Dec. 9, 2008

(87) PCT Pub. No.: WO2005/071695

PCT Pub. Date: Aug. 4, 2005

(65) Prior Publication Data

US 2009/0168141 A1    Jul. 2, 2009

(30) Foreign Application Priority Data

| | | | |
|---|---|---|---|
| Jan. 21, 2004 | (JP) | | 2004-012981 |
| Mar. 4, 2004 | (JP) | | 2004-060600 |
| Mar. 24, 2004 | (JP) | | 2004-086684 |

(51) Int. Cl.
G02F 1/153 (2006.01)

(52) U.S. Cl. ........................ 359/270; 359/265; 359/272; 359/275; 252/62.2; 252/583; 252/586; 429/188; 429/304; 429/325

(58) Field of Classification Search ................. 359/275, 359/265, 270, 272; 252/62.2; 429/188, 304, 429/325

See application file for complete search history.

(56) References Cited

U.S. PATENT DOCUMENTS

| | | | |
|---|---|---|---|
| 5,161,048 A | 11/1992 | Rukavina | |
| 2004/0241553 A1* | 12/2004 | Abe et al. | 429/337 |

FOREIGN PATENT DOCUMENTS

| | | |
|---|---|---|
| EP | 0 469 667 A1 | 2/1992 |
| EP | 1146770 | 10/2001 |
| JP | 4-239521 A | 8/1992 |
| JP | 4-308819 A | 10/1992 |
| JP | 11-149825 A | 6/1999 |
| JP | 2000-11758 A | 1/2000 |
| JP | 2001-351832 A | 12/2001 |
| JP | 2002-505506 A | 2/2002 |
| JP | 2002-258327 A | 9/2002 |
| JP | 2003-178777 A | 6/2003 |

(Continued)

OTHER PUBLICATIONS

International Search Report for PCT/JP2005/000749 mailed May 10, 2005.

(Continued)

*Primary Examiner*—Evelyn A. Lester
(74) *Attorney, Agent, or Firm*—Darby & Darby PC (57) ABSTRACT

An ion conductor has fine particles of an organic polymer including 20 to 80% by mass of ultra-fine particles of an inorganic compound, and an electrolytic solution impregnated into the fine particles of the organic polymer, wherein the fine particles of the organic polymer have a specific surface area measured by the BET method of 30 $m^2/g$ or more.

10 Claims, 2 Drawing Sheets

FOREIGN PATENT DOCUMENTS

| | | |
|---|---|---|
| JP | 2003-315844 A | 11/2003 |
| JP | 2004-339422 A | 12/2004 |
| JP | 2005-36211 A | 2/2005 |
| JP | 2005-68311 A | 3/2005 |
| WO | WO-95/06332 A1 | 3/1995 |
| WO | WO-99/44245 A1 | 9/1999 |
| WO | WO-95/15589 A1 | 6/2005 |

OTHER PUBLICATIONS (1) Seikei Zairyo Silica/Polyamide Nanocomposite 'Seryl', by Idemura et al., Kogyo Zairyo (Engineering Materials), Nov. 1, 2001, vol. 49, No. 11, pp. 35-38.

Patent Abstracts of Japan for JP2001-351832 published on Dec. 21, 2001.

Patent Abstracts of Japan for JP11-149825 published on Jun. 2, 1999.

Patent Abstracts of Japan for JP2000-11758 published on Jan. 14, 2000.

Patent Abstracts of Japan for JP2002-258327 published on Sep. 11, 2002.

Database WPI Week 200433, Derwent Publication Ltd, London, GB AN 2004- 350279. XP002460389.

Krawiec et al, Polymer nanocomposites: a new strategy for synthesizing solid electrolytes for rechargeable lithium batteries, Journal of Power Sources, vol. 54, No. 2, pp. 310-315, 1995. XP-002460386.

Database EPODOC, Composite Electrolyte and its Use, European Patent Office, The Hague, 1998. XP-002460387.

Database EPODOC, Battery Incorporation Organic/Composite Polymer Solid Electrolyte, European Patent Office, The Hague, 2002. XP0024600388.

* cited by examiner

*FIG. 3*

ION CONDUCTOR AND ELECTROCHEMICAL DISPLAY DEVICE UTILIZING THE SAME

CROSS-REFERENCE TO PRIOR APPLICATION

This is a U.S. National Phase Application under 35 U.S.C. § 371 of International Patent Application No. PCT/JP2005/000749 filed Jan. 21, 2005, and claims the benefit of Japanese Patent Applications No. 2004-012981 filed Jan. 21, 2004, 2004-060600 filed Mar. 4, 2004 and 2004-086684 filed Mar. 24, 2004, all of which are incorporated by reference herein. The International Application was published in Japanese on Aug. 4, 2005 as WO 2005/071695 A1 under PCT Article 21(2).

TECHNICAL FIELD

The present invention relates to an ion conductor and an electrochemical display device utilizing the same.

BACKGROUND ART

Solid materials for use as an element between the electrodes of a battery, an electric double-layer capacitor (electric double-layer condenser), or the like, have been developed wherein the use of a structural material which prevents a short-circuit between the electrodes is unnecessary and wherein it is unnecessary to be concerned about the leakage of electrolytic solution. It is required that materials used for these have both the following two properties: a high ion conductivity as an ion conductor and structural stability and processability as a separator on a higher level. As examples of such materials, an intrinsic polymer electrolyte (one that is completely solid) and a polymer gel electrolyte are known.

However, since the ion conductivity of intrinsic polymer electrolytes is basically low (less than $10^{-4}$ S/cm at room temperature), an intrinsic polymer electrolyte used at room temperature has not yet reached practical use.

On the other hand, as examples of polymer gel electrolytes, a homogeneous gel electrolyte made by swelling an organic polymer (polyethylene oxide, polyacrylonitrile, polyvinylidene fluoride, etc.) with an electrolytic solution made by dissolving a supporting electrolyte ($LiClO_4$, quaternary ammonium salts, etc.) in a polar solvent (for example, see patent documents 1 and 2); a structure-based gel electrolyte made by forming an organic polymer (polyolefin, polyethylene oxide, polyacrylonitrile, polyvinylidene fluoride, etc.) into a porous body and by maintaining an electrolytic solution in micropores of the porous body (for example, see patent documents 3 and 4); and that made by impregnating a network-structure support medium comprising a non-electroconductive polymer with an electrolyte (for example, see patent document 5) can be mentioned.

The homogeneous gel electrolyte has the advantage that the electrolytic solution rarely leaks, but it has disadvantage that the ion conductivity is low and does not reach the ion conductivity of an electrolytic solution itself because the maximum capacity to maintain the electrolytic solution is about five times as large as that of organic polymers. On the other hand, the structure-based gel electrolyte has a problem in that the electrolytic solution is likely to leak. Also, both of these have the problem that the kind of solvent used in the electrolytic solution is restricted according to a kind of organic polymer used in terms of compatibility between the organic polymer used as a support maintaining the electrolytic solution and the solvent. For these reasons, the development of ion conductors which have a high capacity to maintain all electrolytic solutions and in which leakage of the electrolytic solution rarely occurs has been anticipated.

Patent Document 1: Japanese Unexamined Patent Application, Publication No. 2001-351832

Patent Document 2: Japanese Unexamined Patent Application, Publication No. H11-149825

Patent Document 3: PCT International Publication No. WO 95/06332

Patent Document 4: PCT International Publication No. WO 95/15589

Patent Document 5: Japanese Unexamined Patent Application, Publication No. 2000-11758

DISCLOSURE OF INVENTION

Problems to be Solved by the Present Invention

The object of the present invention is to provide an ion conductor wherein the amount of electrolytic solution impregnated can be made large independent of the kind of solvent used in the electrolytic solution and the concentration of the supporting electrolyte so that a high ion conductivity can be obtained and the electrolytic solution impregnated rarely leaks.

Means for Solving the Problems

The inventor discovered that the above problem can be solved by an ion conductor wherein fine particles of an organic polymer whose specific surface area measured by the BET method is large and which include a large amount of ultra-fine particles of inorganic compound whose average particle diameter is 500 nm or less, are impregnated with an electrolytic solution, and this resulted in the present invention.

That is, the object of the present invention is to provide an ion conductor comprising: fine particles of an organic polymer including 20 to 80% by mass of ultra-fine particles of an inorganic compound; and an electrolytic solution impregnated into the fine particles of the organic polymer, wherein the above ultra-fine particles of the inorganic compound have an average particle diameter of 500 nm or less and the fine particles of the organic polymer have a specific surface area of measured by the BET method of 30 $m^2/g$ or more.

EFFECTS OF THE INVENTION

In the ion conductor of the present invention, the amount of the electrolytic solution impregnated can be made large independent of the kind of solvent used in the electrolytic solution and a concentration of a supporting electrolyte so that a high ion conductivity is obtained and the electrolytic solution impregnated hardly leaks.

DESCRIPTION OF SYMBOLS 1 represents an ion conductor according to the present invention (including a material which changes color because of an electrochemical oxidation-reduction reaction);
2 represents a transparent substrate;
3 represents a transparent electrode;
4 represents a counter electrode;
5 represents a sealing medium;
6 represents a counter substrate;
7 represents a color-developing layer which changes color by an electrochemical oxidation-reduction reaction; and
8 represents an ion conductor according to the present invention.

BEST MODE FOR CARRYING OUT THE INVENTION

Hereinafter, the ion conductor of the present invention is explained in detail.

(Fine Particles of an Organic Polymer and Ultra-Fine Particles of an Inorganic Compound)

Fine particles of an organic polymer used in the ion conductor of the present invention include ultra-fine particles of an inorganic compound whose average particle diameter is 500 nm or less.

It is mentioned that inorganic fine particles of silica, alumina, etc. on a micrometer scale are added to the intrinsic polymer electrolyte and the polymer gel electrolyte for the purpose of improving the strength of membranes, properties of pressure resistance, etc. of the ion conductor.

However, the fine particles of the organic polymer used in the present invention include 20 to 80% by mass of ultra-fine particles of the inorganic compound whose average particle diameter is 500 nm or less. These cannot be obtained easily by simply mixing organic polymers with inorganic compounds. As for the organic polymers including the ultra-fine particles of the inorganic compound whose average particle diameter is 500 nm or less, their specific surface area measured by the BET method can be made quite large because their content of the ultra-fine particles of the inorganic compound increases and this is different from the case in which the organic polymers include the particles of the inorganic compound on a micrometer scale.

The ultra-fine particles of the inorganic compound used in the present invention refer to fine particles of 500 nm or less on a nanometer scale.

The organic polymer is not particularly limited as long as it can include a high content of an inorganic compound in a state of ultra-fine particles, but polyamides, polyurethanes and polyureas having a polar group which has an affinity with inorganic compounds such as metal oxides, metal hydroxides, metal carbonates, etc. are preferable.

An example of a method for producing fine particles of these organic polymers is by interfacial polycondensation. This occurs from contact between: an organic solvent solution (A) including at least one compound selected from the group consisting of a dicarboxylic acid dihalide, dihaloformate and phosgene, and an organic solvent; and an aqueous solution (B) including a metal compound of at least one alkali metal element and other metal elements, a diamine and water.

For example, a polyamide can be obtained by the polycondensation of a dicarboxylic acid dihalide with a diamine; a polyurethane can be obtained by polycondensation of a dihaloformate such as dichloroformate, etc. with a diamine; a polyurea can be obtained by polycondensation of a phosgene, etc. with a diamine; and their structures are determined according to the kind of monomer used for polycondensation.

As an example of inorganic compounds, at least one inorganic compound selected from the group consisting of a metal oxide, metal hydroxide and metal carbonate can be preferably shown, but a metal oxide is preferable because it is easy to form ultra-fine particles whose average particle diameter is 500 nm or less.

Examples of metal oxides include silica ($SiO_2$), aluminum oxide, tin oxide, zirconium oxide, zinc oxide, manganese oxide, etc. Silica and aluminum oxide are preferable in terms of the amount of electrolytic solution which can be impregnated and the magnitude of ion conductivity.

The above-described production method makes it possible to include the inorganic compound in a state of ultra-fine particles whose average particle diameter is 500 nm or less and in 20 to 80% by mass. Also, since the ultra-fine particles of the inorganic compound hardly separate from the fine particles of the organic polymer and the capacity to be impregnated with an electrolytic solution can be high, the average particle diameter of the ultra-fine particles of the inorganic compound is preferably 300 nm or less, more preferably 100 nm or less and most preferably 50 nm or less.

In terms of a balance between a capacity to be impregnated with an electrolytic solution as a function of an ion conductor, and properties of a membrane such as processability, elasticity, heat resistance, etc. as a separator, it is preferable that the content of the ultra-fine particles of the inorganic compound be 30 to 70% by mass with respect to the fine particles of the organic polymer.

If an inorganic compound is attempted to be compounded with an organic polymer with a mixing equipment (extruder, etc.), under the present conditions, it is quite difficult for the inorganic compound to be included in fine particles of organic polymer in a state of ultra-fine particles of 500 nm or less and in a high content of 20% by mass or more, because of the self-cohesiveness characteristic of inorganic compounds. However, any production method can be applied if the fine particles of the organic polymer can include 20 to 80% by mass of an inorganic compound in a state of ultra-fine particles of 500 nm or less by treating the surface of the inorganic compound, or by improving the dispersing agent, the dispersing device, etc.

It is preferable that the shape of the above-described fine particles of the organic polymer be fine particles whose average particle diameter is 1 to 1000 μm. Also, a shape wherein the average breadth of the fine particles of the organic polymer is 20 μm or less and the average aspect ratio of the organic polymer is 5 to 20 is preferable. In particular, it is preferable that the fine particles of the organic polymer be in the shape of bent microfibers (pulp). The average particle diameter hereof represents a particle diameter obtained by calculating the arithmetic average of the breadth and length of the particles. The ultra-fine particles of inorganic compound in the organic polymer cannot contribute effectively to forming a specific surface area and the impregnation with an electrolytic solution unless the organic polymer is in the shape of fine particles.

The ion conductor of the present invention can be impregnated with a large amount of electrolytic solution such that the solution is hard to leak and an ion conductor impregnated with 500 to 2000% by mass of an electrolytic solution with respect to the fine particles of the organic polymer including the ultra-fine particles of the inorganic compound can be produced.

(Electrolytic Solution)

The electrolytic solution of the present invention comprises a supporting electrolyte and a solvent for dissolving the supporting electrolyte.

The solvent may be either aqueous or non-aqueous and, in addition to water, polar organic solvents (propylene carbonate, dimethyl carbonate, 2-ethoxyethanol, 2-methoxymethanol, isopropyl alcohol, N-methylpyrrolidone, dimethylacetamide, dimethylformamide, acetonitrile, butyronitrile, glutaronitrile, dimethoxyethane, γ-butyrolactone, ethylene glycol, propylene glycol, etc.) can be mentioned as examples. In addition, if an aqueous solvent is used, of the above-described non-aqueous solvents, solvents compatible with water can be used by dissolving them in the aqueous solvent so that solidification at 0° C. or less can be prevented and the ion conductor can be used at a low temperature.

As examples of the supporting electrolyte, lithium salts (lithium chloride, lithium bromide, lithium iodide, lithium perchlorate, lithium nitrate, lithium sulfate, lithium tetrafluoroborate, lithium hexafluorophosphate, etc.); alkali metal halides (sodium chloride, sodium bromide, sodium iodide, potassium chloride, potassium bromide, potassium iodide, etc.); ammonium salts (tetrabutylammonium bromide, tetrabutylammonium chloride, ammonium fluoroborate, tetraethylammonium tetrafluoroborate, tetrabutylammonium tetrafluoroborate, tetraethylammonium perchlorate, tetra-n-butylammonium perchlorate, etc.); inorganic acids (sulfuric acid, hydrochloric acid, perchloric acid, etc); and the like can be mentioned.

The concentration of the supporting electrolyte may be appropriately set according to the intended use of the ion conductor of the present invention and its required performance, but is not particularly limited.

(Method for Producing an Ion Conductor)

The ion conductor of the present invention can be produced by a method comprising:

a process of synthesizing fine particles of organic polymer wherein the fine particles of organic polymer are obtained by interfacial polycondensation caused from contact between: an organic solvent solution (A) containing at least one compound selected from the group consisting of a dicarboxylic acid dihalide, dihaloformate and phosgene, and an organic solvent, and an aqueous solution (B) containing a metal compound of at least one alkali metal element and other metal elements, a diamine and water; and a process of impregnation for impregnating the fine particles of the organic polymer with an electrolytic solution.

(Process of Synthesizing Fine Particles of Organic Polymer)

In the process of synthesizing fine particles of organic polymer used suitably for the present invention, the monomer in the organic solution (A) and the diamine in the aqueous solution (B) are quickly polycondensated by stirring from about ten seconds to several minutes at room temperature under normal pressure and an organic polymer can be obtained in a large yield. In this case, an alkali metal in the metal compound such as an alkali silicate, etc. acts as a remover of a hydrogen halide generated in the polycondensation of the monomer with the diamine so that production of the fine particles of the organic polymer are promoted. During this reaction, the metal compound containing an alkali metal becomes insoluble in the organic solution or water and, precipitates. This is because its alkali metal content is removed. If an alkali silicate is used, it is converted into silica (glass) in this way and, if other metal compounds are used, they are converted into inorganic compounds containing a metal element excluding alkali metals as well. In this case, only one of the production of the organic polymer by polycondensation of the monomer with the diamine and the precipitation of the inorganic compound does not occur singularly, instead, they occur in parallel, so that the inorganic compound does not form a coagulated structure and can form ultra-fine particles on a nanometer scale.

As examples of dicarboxylic acid dihalides in the organic solution (A), acid halides of aliphatic dicarboxylic acids (succinic acid, adipic acid, azelaic acid, sebacic acid, etc.); acid halides of aromatic dicarboxylic acids (isophthalic acid, terephthalic acid, etc.); acid halides of aromatic carboxylic acids wherein hydrogen atoms in the aromatic rings are substituted; and the like can be mentioned.

As examples of dihaloformate compounds in the organic solution (A), aliphatic diols (1,3-propanediol, 1,4-butanediol, 1,6-hexanediol, 1,8-octanediol, etc.) wherein all of the hydroxyl groups are chloroformated by way of phosgenation; bivalent phenols having two hydroxyl groups in one, two or more aromatic rings (for example, of recorcin (i.e. 1,3-dihydroxybenzene) or hydroquinone (i.e., 1,4-dihydroxybenzend)), wherein all of the hydroxyl groups are chloroformated by a way of phosgenation can be mentioned.

As examples of phosgenes in the organic solution (A), phosgene, diphosgene and triphosgene can be mentioned.

The above-described monomers can be used alone or as a mixture of two or more kinds.

A kind of organic polymer in the present invention can be changed by selecting a monomer used in the organic solution (A). When a dicarboxylic acid dihalide is used as a monomer, a polyamide can be obtained by a reaction with a diamine in the aqueous solution (B). When a dihaloformate is used as a monomer, a polyurethane can be obtained. When a phosgene is used as a monomer, a polyurea can be obtained.

The organic solvent used in the organic solution (A) is not particularly limited as long as the solvent does not react with the above-described monomers and diamines, and can dissolve the monomer in the organic solution (A). Of these, as typical examples of those incompatible with water, aromatic hydrocarbons (toluene, xylene, etc.); aliphatic hydrocarbons (n-hexane, etc.); halogenated hydrocarbons (chloroform, methylene chloride, etc.); and alicyclic hydrocarbons (cyclohexane, etc.) can be mentioned and, as typical examples of those compatible with water, ethers (tetrahydrofuran, etc.); ketones (acetone, methyl ethyl ketone, etc.); and alkyl acetates (ethyl acetate, propyl acetate, etc.) can be mentioned.

When a solvent incompatible with water is used as an organic solvent of the organic solution (A), the polycondensation reaction becomes an interfacial polycondensation generated only at a boundary surface between the organic solution (A) and the aqueous solution (B) so that an organic polymer in the form of fibers (pulp) is likely to be obtained. In particular, when an acid halide of aliphatic dicarboxylic acids as a monomer in the organic solution (A) and an aliphatic diamine as a monomer in the aqueous solution (B) are used, the molecular weight of the obtained organic polymer can be easily increased so that fine particles of the organic polymer in the form of fibers is likely to be obtained.

On the other hand, when a solvent compatible with water is used as an organic solvent of the organic solution (A), polycondensation occurs in which the organic solvent and water are emulsified so that fine particles of the organic polymer in the form of powder can be easily obtained. No matter which organic solvent is used, fine particles of the organic polymer obtained are in a form of powder or fibers, and the inorganic compound contained is in a state of ultra-fine particles, such that the specific surface area becomes large. Therefore, it is possible to be impregnated with an electrolytic solution easily, immediately, and in a large amount.

The diamine used in the aqueous solution (B) is not particularly limited as long as it reacts with the monomer used in the organic solution (A) and produces an organic polymer. For example, aliphatic diamines (1,3-diaminopropane, 1,4-diaminobutane, 1,6-diaminohexane, 1,8-diaminooctane, etc.); aromatic diamines (m-phenylenediamine, p-phenylenediamine, etc.); derivatives of aromatic diamine wherein hydrogen atoms in the aromatic ring are substituted; and the like can be mentioned. These may be used alone or as a mixture of two or more kinds.

The concentration of the monomer in the organic solution (A) and the concentration of the diamine in the aqueous solution (B) are not particularly limited as long as the polycondensation reaction can proceed sufficiently, but are preferably in the range of 0.01 to 3 mol/L, more preferably in the range of 0.05 to 1 mol/L such that each of the monomers can contact well with one another.

As examples of alkali silicates in the aqueous solution (B), those represented by the composition formula of $A_2O \cdot nSiO_2$ (water glass #1, #2, #3, etc. described in JIS K 1408) and the like can be mentioned. Herein, "A" represents an alkali metal and the average value of n is 1.8 to 4. An alkali metal compound contained in an alkali silicate acts as a remover of acids which are generated when the monomer in the organic solution (A) and the diamine in the aqueous solution (B) are polycondensated, so that the alkali silicate promotes the polycondensation of the monomers with diamines and is simultaneously converted to silicon oxide (silica) which is insoluble in solvents and this also becomes a material for the ultra-fine particles of the inorganic compound contained in the fine particles of the organic polymer.

As examples of the metal compounds of at least one alkali metal element and other metal elements in the aqueous solution (B), compounds represented by the general formula $A_xM_yB_z$ can be mentioned. Herein, "A" represents an alkali metal element; "M" represents a transition metal element of Groups 3 to 12 or a typical metal element of Groups 13 to 16 of the periodic table; "B" represents at least one functional group selected from the group consisting of O, $CO_3$ and OH; and "x", "y", and "z" represent numbers enabling bonds of "A", "M" and "B". Of compounds represented by the above general formula $A_xM_yB_z$, those soluble in water and showing basicity are preferable. In the same way as the alkali metal compound in the alkali silicate, the alkali metal compound contained in the metal compound containing an alkali metal also acts as a remover of acids in the polycondensation, such that the alkali silicate promotes the polycondensation of the monomer with the diamine and is simultaneously converted to a metal compound insoluble in solvents. As a result, this becomes a material for ultra-fine particles of the inorganic compound contained in fine particles of the organic polymer.

Of the metal compounds containing an alkali metal, compounds of the above general formula wherein "B" is O (an oxygen atom) can include sodium complex oxides (sodium zincate, sodium aluminate, sodium chromite, sodium molybdate, sodium stannate, sodium titanate, sodium vanadate, sodium tungstate, etc.); potassium complex oxides (potassium zincate, potassium aluminate, potassium chromite, potassium molybdate, potassium stannate, potassium manganate, potassium tantalate, potassium tungstate, potassium aurate, potassium argentate, etc.); lithium complex oxides (lithium aluminate, lithium molybdate, lithium stannate, etc.); rubidium complex oxides; cesium complex oxides; and the like.

As examples of metal compounds containing alkali metals wherein "B" in the above general formula includes both of the groups of $CO_3$ and OH, potassium zinc carbonate, potassium nickel carbonate, potassium zirconium carbonate, potassium cobalt carbonate, potassium tin carbonate, etc. can be mentioned.

These metal compounds containing alkali metals may be hydrates to be dissolved in water. Also, these can be used alone or as a mixture of two or more kinds In addition, these may be used simultaneously with the above-described alkali silicates.

As inorganic compounds, metal oxides are preferable and, as examples of metal oxides, aluminum oxide, tin oxide, zirconium oxide, zinc oxide, manganese oxide, molybdenum oxide, tungsten oxide and silica can be mentioned. In particular, aluminum oxide and silica are preferable because their average particle diameters of the fine particles are small and their fine-dispersibility is excellent.

On the other hand, as an organic polymer, polyamides, polyurethanes and polyureas are preferable. The shape of the fine particles of the organic polymer and the shape of the ultra-fine particles of the inorganic compound vary according to the combination of an organic polymer. Of these combinations, fine particles of organic polymer wherein ultra-fine particles of aluminum oxide and/or silica are included in fine particles of organic polymer of polyamides can be mentioned as a preferable mode.

(Device for Producing Ultra-Fine Particles of Organic Polymer)

A device used for synthesizing fine particles of organic polymer by the above-described production method is not particularly limited as long as the device can make an excellent contact between the organic solution (A) and the aqueous solution (B) and this can be either a continuous system or processed in batches. When an aliphatic diamine is used as a diamine in the aqueous solution (B) and an aliphatic dicarboxylic acid dihalide is used as a monomer in the organic solution (A), a solid gel-like product may be produced by the polycondensation. In this case, it is preferable that a mixer having a strong shearing force be used in order to crush the gel-like product and to further cause the reaction, and as an example of such a mixer, a blender produced by Osterizer, Co. Ltd., and the like can be mentioned.

The polycondensation reaction of the monomer in the organic solution (A) with the diamine in the aqueous solution (B) proceeds sufficiently at around temperature for example, in the range of −10 to 50° C. Therefore, the temperature at which the contact between the organic solution (A) and the aqueous solution (B) takes place is in the range of temperature of −10 to 50° C. In this case, neither compression nor decompression is necessary. Also, the polycondensation reaction is completed in a short period of time, usually within fifteen minutes or less although this is dependent upon the kind of monomer and reaction device used.

(Process of Producing an Ion Conductor)

The ion conductor of the present invention can be obtained by impregnating the fine particles of the organic polymer obtained in the above manner with an electrolytic solution.

The fine particles of the organic polymer, obtained by the above-described process of synthesizing fine particles of organic polymer are obtained in a wet cake-like form impregnated with 400 to 700% by mass of water with respect to the fine particles of the organic polymer, but the wet cake-like fine particles of the organic polymer may be impregnated with an electrolytic solution and the water may be substituted with the electrolytic solution or the wet cake-like fine particles of the organic polymer may be dried once and the dried fine particles of the organic polymer may be impregnated with an electrolytic solution. However, if the wet cake-like fine particles of the organic polymer are dried and the fine particles of the organic polymer stably solidify owing to hydrogen bonds derived from polar groups of the organic polymer, it is difficult for the fine particles of the organic polymer to absorb an electrolytic solution and the amount of the electrolytic solution impregnated therein cannot be so large. Therefore, the method wherein the wet cake-like fine particles of the organic polymer are impregnated with an electrolytic solution and the solvent is substituted with the electrolytic solution.

As an example of a method for impregnating the fine particles of the organic polymer with an electrolytic solution, a method wherein the fine particles of the organic polymer are cast into an electrolytic solution prepared in advance and filtered after being dispersed adequately; a method wherein an electrolytic solution passes through the fine particles of the organic polymer for impregnating them; a method wherein the formerly-contained solvent is distilled out after the fine particles of the organic polymer are dispersed in an electrolytic solution; or the like can be mentioned, but the method is not limited to these. The fine particles of the organic polymer of the present invention can be made as a wet cake impregnated with 500 to 2000% by mass of an electrolytic solution with respect to the fine particles of the organic polymer by only carrying out simple procedures such as charging and dispersing the fine particles of the organic polymer in the electrolytic solution, and filtering them. This is because their property to be impregnated with an electrolytic solution is excellent due to a presumptive mechanism described hereinafter. Also, the dispersion of the fine particles of the organic polymer in an electrolytic solution can be easily carried out by using a general-purpose stirring tank because the fine particles of the organic polymer are obtained in the form of fibers or powder.

(Properties of Processability of Ion Conductor)

If the fine particles of the organic polymer have the form of fibers, in particular, they preferably have a form of pulp wherein the gauge of fibers is 20 um or less and the aspect ratio is 10 or more, then, they have the processability to be made into paper. If the fine particles of the organic polymer are in a form of powder, then, they have the capability to be used for coating. Therefore, the fine particles of the organic polymer themselves have the processability and properties of being handled easily. In particular, if the fine particles of the organic polymer are in the form of fibers, a sheet of the wet cake whose tensile strength, flexibility, and plasticity against inflection are high can be obtained by filtering the solution prepared by dispersing the fine particles of the organic polymer in an electrolytic solution. Therefore, it is unnecessary to compound or mix them with other materials and, if an ion conductor comprising only the fine particles of the organic polymer and the electrolytic solution is used, the ion conductor can also function as a separator.

(Mechanisms of Impregnation with an Electrolytic Solution for Developing a Property of Ionic Conduction)

The ion conductor of the present invention can be impregnated with a large amount of 500 to 2000% by mass of an electrolytic solution with respect to the fine particles of the organic polymer so that it can almost have the same ion conductivity as that of an electrolytic solution wherein a supporting electrolyte is dissolved. It is assumed that the property of impregnation with an electrolytic solution of the ion conductor of the present invention is developed by chemical properties and conformational factors which the fine particles of the organic polymer and the ultra-fine particles of the inorganic compound contained in the organic polymer have.

The inorganic compound in the fine particles of the organic polymer has a high affinity with polar solvents as represented by silica, metal oxides, metal hydroxides, metal carbonates, etc. Also, the content of the inorganic compound is high as it is represented as 20 to 80% by mass. Furthermore, the inorganic compound is made up of ultra-fine particles whose average particle diameter is 500 nm or less.

In addition, because the organic polymer is also in a form of fine particles, the ultra-fine particles of the organic polymer are likely to be present not inside the organic polymer but on the surface of the fine particles of the organic polymer. If the fine particles of the inorganic compound on a nanometer scale, whose surface area per unit mass is quite large, are present on the surface of the fine particles of the organic polymer, then the surface becomes larger and a high affinity with polar solvents is imparted. Also, it is thought that the fine particles of the organic polymer can have a property such that they can be impregnated with a large amount of an electrolytic solution because the ultra-fine particles of the inorganic compound present on the surface form a gap filled with the electrolytic solution between the fine particles of the organic polymer.

Thus, since the ion conductor of the present invention can be impregnated with most polar solvents such as water, polar solvents used in the electrolytic solution are not limited. Also, even if the concentration of the supporting electrolyte in the electrolytic solution is increased, the ability to be impregnated with an electrolytic solution is hardly affected.

In order to make the amount of the electrolytic solution impregnated large by increasing the specific surface area, the average particle diameter of the ultra-fine particles of the inorganic compound is preferably 300 nm or less, and more preferably 100 nm or less. Also, the content of the ultra-fine particles of the inorganic compound in the organic polymer is preferably 40% by mass or more, and more preferably 60% by mass or more. The fine particles of the polymer of the present invention can include 80% by mass of them.

(Specific Surface Area)

The above-described mechanism of impregnation is supported by the fact that the specific surface area measured by the BET multi-point method increases from 30 $m^2/g$ to 150 $m^2/g$ when the content of the ultra-fine particles of the inorganic compound included in the fine particles of the organic polymer increases from 20% by mass to 80% by mass.

In particular, if the inorganic compound is silica or aluminum oxide, the particle diameter of the ultra-fine particles of the inorganic compound become quite fine as about 10 nm. Furthermore, Observation by transmission electron microscopy (TEM) revealed that a network structure was formed wherein the fine particles of the inorganic compound linked in part. Because of this structure, the fine particles of the organic polymer have a large specific surface area of 50 to 150 $m^2/g$ and are able to have a higher capability to be impregnated with an electrolytic solution.

It is preferable that the organic polymer be a polyamide, polyurethane or polyurea. This is because an amide bond, urethane bond or urea bond present in the polymer makes it possible to include the fine particles of the inorganic compound and to have an affinity with polar solvents, so that it is possible for the fine particle of the polymer to be impregnated with much more electrolytic solution.

Thus, the organic polymer content also contributes to the property of impregnation with an electrolytic solution, but it is impossible to be impregnated with a large volume of the electrolytic solution based only on the affinity of the organic polymer. When, in the above-described process of synthesizing fine particles of organic polymer, fine particles of the organic polymer (e.g. polyamide) including no inorganic compound were synthesized by using caustic soda instead of metal compounds containing alkali metals; the fine particles of the organic polymer indicated a specific surface area measured by the BET method of less than 1 $m^2/g$; and the amount of the electrolytic solution impregnated therein represented a very low value although the fine particles of the organic polymer were in the form of fibers. Because of this, in the ion conductor of the present invention, the combination of the organic polymer in a state of fine particles and the inorganic compound included in a state of ultra-fine particles included therein is important. The organic polymer having a specific surface area measured by the BET method of 30 $m^2/g$ or more provides an ion conductor that can satisfy the object of the present invention.

The ion conductivity of the ion conductor of the present invention varies widely with the amount of electrolytic solution impregnated into the organic polymer and the ion conductivity thereof, but can achieve $1 \times 10^{-3}$ S/cm or more; more preferably $2 \times 10^{-3}$ S/cm or more; most preferably $5 \times 10^{-3}$ S/cm or more.

(Mechanical and Thermal Properties)

In conventional ion conductors made by using polymer gel electrolytes and the like, compatibility between the properties of the membrane such as elasticity, which is necessary to prevent a short-circuit when used as a separator, heat resistance, etc. and a high ion conductivity was not sufficient.

The fine particles of the organic polymer of the present invention can have high heat resistance because the fine particles of the inorganic compound reinforce the organic polymer. For example, when the organic polymer is a polyamide, the inorganic compound is silica and the content of silica is 60% by mass, the fine particles of organic polymer do not change in physical properties at 300° C. or less. The ion conductor of the present invention obtained by impregnating this with a polar solvent is also excellent with respect to heat resistance.

(Solvent Resistance and Repetition Durability)

In addition, the fine particles of the organic polymer of the present invention can have high solvent resistance. For example, when the organic polymer is a polyamide and the inorganic compound is silica, the fine particles of organic polymer are very stable against liquid solutions excluding cresols, which can dissolve polyamides, and strong alkali solutions, which can dissolve silica. Therefore, even strong acid solutions in which hydrochloric acid, sulfuric acid, and nitric acid dissolve can be used as an electrolytic solution. Also, when the ion conductor of the present invention is used as a material for an electrochemical apparatus such as a secondary battery, an electric double layer capacitor, etc., or an electrochemical display apparatus, it hardly deteriorates even if charging and discharging, or coloring and decoloring are repeated.

The ion conductor of the present invention is characterized in that it can be used alone. However, binding materials such as a binding agent, a wide variety of resins, etc. may be included for, among others, the purpose of improving the strength of the ion conductor shaped into a membrane to such a degree that this does not impair any of the necessary properties.

(Electronically Insulating Properties)

The ion conductor of the present invention can be used as an electrolyte in batteries or as a separator of electric double layer capacitors. In this case, as it is necessary for the ion conductor to have electronically insulating properties, it is preferable that electron-conductive materials are not used in the organic polymer and the inorganic compound which form the fine particles of organic polymer.

If tin oxide or the like which has electron conductivity is used as an inorganic compound and the content is high, i.e. about 60% by mass or more, electron conductivity may be present. However, materials of inorganic compounds other than this hardly have electron conductivity and they can be used without any problems. Even if the organic polymer is any one of a polyamide, polyurethane, and polyurea, they have no electron conductivity and the ion conductor can be preferably used as an electrolyte for batteries or a separator for an electric double layer capacitor.

(Medium for an Electrochemical Display Device)

The ion conductor of the present invention can be favorably used as a medium for an electrochemical display device. More specifically, the ion conductor of the present invention is a material that has excellent ion conductivity, electronically insulating properties, elasticity, and heat resistance and, therefore, it can be used as a medium for an electrochemical display device. A display device with excellent coloring and decoloring properties involved with an electrochemical reaction (for example, excellent contrast ratio, response speed, etc.) can be produced. The best merit of a medium for a reflective display device wherein the ion conductor indicates white by the reflection of an external light source is that it can be compatible with extended use because, among other things, it hardly tires the eyes; the screen follows ambient brightness; and directional vertical light is not incident upon the eyes. How a natural and soft whiteness resulting from light scattering, which is close to the color of white paper, is generated is critical for the purpose of developing this merit.

The ion conductor of the present invention can be used as a white medium having the texture of paper, that can be described as a medium for a paper-white display device. For example, the Japanese Unexamined Patent Application, Publication No. H14-258327 describes an electrochromatic display device comprising a layer of polymer solid electrolytes which includes a white-coloring agent such as titanium oxide, or the like, and a layer of polymer materials which changes color during an electrochemical oxidation-reduction reaction; and an electrodeposition display device wherein a layer of polymer solid electrolyte which includes a white-coloring agent of titanium oxide, etc. and a color-developing agent of metal ions is placed between electrodes. However, in this method, a white pigment is used, so that its clarity and texture are quite different from paper. Also, the white pigment must be added in a large amount in order to obtain sufficient white-coloring. However, if the white pigment is included in 20% by mass or more, it aggregates, and does not contribute to the ionic conduction, and, furthermore, the ion conductivity becomes inferior. Therefore, it had the problem in which the response speed of display became slow so that the activation voltage elevated.

By using the fine particles of the organic polymer in the form of fibers, the ion conductor of the present invention can be used as a display medium whose degree of whiteness is very high and whose clarity is close to paper. It can also provide a reflective electrochemical display device whose clarity and texture is quite close to paper.

(Mechanism of White-Coloring by Component Species of Organic Polymer)

If it is used as a medium for a display device, the polymer of the ion conductor is preferably a polyamide, polyurethane or polyurea. Moreover, it is preferable that the organic polymer have no conjugated system in its polymer chains because, if the degree of whiteness is high, then, the contrast ratio at the time of coloring becomes high so that favorable clarity can be established. For this reason, an aliphatic polyamide, polyurethane and polyurea are preferably used.

In particular, an ion conductor in the form of a sheet whose appearance is similar to paper and whose capacity to be impregnated with an electrolytic solution is high can be obtained by dispersing the fine particles of organic polymer in a form of fibers whose breadth is 20 μm or less and whose aspect ratio is 10 or more in an electrolytic solution and by filtering them. Because the ion conductor has random micro-irregularities and gaps filled with the electrolytic solution on its surface and inside, incident light scatters in every direction at the interface between the impregnating electrolytic solution and the particles of the polymer. Because this is a mechanism of white-coloring similar to paper and whiteness close to paper can be established, this method is preferably used in particular. By including a color-developing agent which changes color by an electrochemical oxidation-reduction reaction in the electrolytic solution impregnated into the fine particles of the organic polymer at this time, displaying by the use of the color-developing agent on a paper-like background can be done. In particular, the ion conductor of the present invention can be preferably used as a medium for an electrochemical display device by using a color-developing agent which reversibly changes color by an electrochemical oxidation-reduction reaction.

(Mechanism of White-Coloring by Inorganic Species)

The ultra-fine particles of the inorganic compound which present transparent or white color, are preferably used as materials which are included in the fine particles of the organic polymer because they can enhance the degree of whiteness of the display medium. As examples of such materials, silica, aluminum oxide, zirconium oxide, zinc oxide, tin oxide, etc. can be mentioned.

Because zirconium oxide, zinc oxide and tin oxide can be made in the form of ultra-fine particles whose average particle diameter is 100 nm to 500 nm in the ion conductor of the present invention, they can contribute to impregnation with an electrolytic solution. Also, they can simultaneously develop a high degree of whiteness by suitably scattering light between the organic polymers or the surrounding electrolytic solution because the index of refraction is large in that it is 2 or more.

On the other hand, in the fine particles of the organic polymer obtained by the above-described process for synthesizing fine particles of organic polymer, wherein the inorganic compound is silica or aluminum oxide, it has been found by transmission electron microscopy (TEM) observation that the ultra-fine particles of the inorganic compound are very fine in that the particle diameter is about 10 nm and that each of the ultra-fine particles of the inorganic compound can form a network structure. In this case, if the size of the entire network formed by the ultra-fine particles of the inorganic compound becomes equal to or larger than the wavelength of visible light, the scattering of visible light occurs with high frequency at a very broad interface of the fine particles of the organic polymer, and a very high degree of whiteness can be imparted to the fine particles of the organic polymer. Therefore, these are preferably used.

(Electrolytic Solutions for a Display Device)

By adding a color-developing agent which changes color due to an electrochemical oxidation-reduction reaction to the electrolytic solution used in the ion conductor of the present invention, the ion conductor can be used as a medium for a display device. The color-developing agent may be either an organic compound or metal compound.

(Organic Compound-Based Color-Developing Agent)

As typical examples of organic compounds used as color-developing agents, quinone-based compounds and leuco dyes can be mentioned. Examples of quinone-based compounds can include red-color-developing compounds such as anthraquinone, 2-methylanthraquinone, 2-ethylanthraquinone, tert-butylanthraquinone; purple-color-developing compounds such as dihydroxyanthraquinone, 1,5-dichloroanthraquinone; yellow-color-developing compounds such as anthraquinone-2-sulfonate; green-color-developing compounds such as benzanthraquinone; and the like or organic quinones that are derivatives thereof. These organic quinones generate a condition of coloring characteristic of each compound by applying driving voltage on electrodes. Also, examples of leuco dyes can include black leuco dyes such as 2-amino-6-diethylamino-3-methylfluorane, etc.; blue leuco dyes such as 3,3-bis(4-dimethyl-aminophenyl)-6-dimethylaminophthalide, etc.; red leuco dyes such as 9-diethylaminobenzofluorane, etc; 3-cyclohexylamino-6-chlorofluorane (orange), 3-diethylamino-7,8-benzofluorane (pink), and 2-anilino-6-diethylaminofluorane (green).

However, the color-developing agent used in the present invention is not limited to these compounds.

(Metal Compound-Based Color-Developing Agent)

It is known that metal ions deposit and develop a color on electrodes if they are chemically reduced in an electrolytic solution. Examples of such metal ions can include ions such as silver, bismuth, capper, iron, chromium, nickel, etc. These are ionized by dissolving halides, sulfites, sulfates, nitrate, perhalogenates, etc. of these metals in an electrolytic solution and the electrolytic solution can be used as a color-developing agent. For example, if an electrolytic solution wherein a silver compound is dissolved is used, a reduction reaction of $Ag^+ + e^- \rightarrow Ag$ occurs at a cathode when the driving voltage is applied on electrodes and the surface of the electrode changes to black because of the deposit of Ag. With regard to the above-described metal, bismuth and silver are more preferably used because these are almost transparent when dissolved in an electrolytic solution and, furthermore, the colors of the deposits are deep, and their reversible reactions of coloring and decoloring are favorable. Also, these metal ions may be used alone or as a mixture of two or more.

With regard to the metal compounds which can be sources of metal ions, examples of silver compounds can include silver perchlorate, silver chlorate, silver acetate, silver bromate, silver iodate, silver carbonate, silver oxide, silver sulfate, silver sulfide, silver nitrate, silver nitrite, etc. in addition to silver halides (silver chloride, silver bromide, silver iodide, etc.). Also, examples of bismuth compounds can include bismuth oxide, bismuth hydroxide, bismuth oxychloride, bismuth oxyperchlorate, bismuth oxysulfate, bismuth sulfate, bismuth sulfide, bismuth nitrate, bismuth phosphate, etc. in addition to bismuth halides (bismuth chloride, bismuth bromide, etc.).

When the above coloring-decoloring compounds are used, it is necessary to select a solvent and a supporting electrolyte suitable for each coloring agent as the best materials. In the ion conductor of the present invention, the index of refraction of the organic polymer is usually approximately 1.5, but the degree of whiteness derived from light-scattering becomes larger by using an electrolytic solution wherein the difference between the index of refraction thereof and the index of refraction of the organic polymer is large. This is so that a display medium which has clarity and texture close to that of paper can be produced. Therefore, a solvent whose degree of refraction is preferably 1.40 or less, and more preferably 1.38 or less is used. As examples of such solvents, in addition to water, nitrites (acetonitrile, propyonitrile, etc.); alcohols (methanol, ethanol, 2-ethoxyethanol, 2-methoxymethanol, isopropyl alcohol, etc.); alkyl acetates (ethyl acetate, isopropyl acetate, etc.); and mixtures thereof can be mentioned.

Moreover, for the purpose of improving the reversibility of coloring-decoloring, additives such as an oxidation-reduction accelerator, buffer materials, pH adjustor, gloss agent, etc. may be used.

With regard to the method for producing a medium for a display device of the present invention, an organic or inorganic coloring agent may be dissolved beforehand in the electrolytic solution used in the process of impregnating with an electrolytic solution for producing the ion conductor. Except for this difference, the production of the ion conductor is the same as the aforementioned embodiments.

(Display Device)

An electrochemical display device can be produced from two electrode plates, the ion conductor of the present invention placed between the two plates, and materials which can reversibly change color by an electrochemical oxidation-reduction reaction caused from ion conduction in the ion conductor.

As display devices wherein the ion conductor of the present invention is used, two systems can be mentioned. The electrochemical display device of the first system is an electrochemical display device wherein the materials which reversibly change color by an electrochemical oxidation-reduction reaction are included in the ion conductor.

Figure 1:
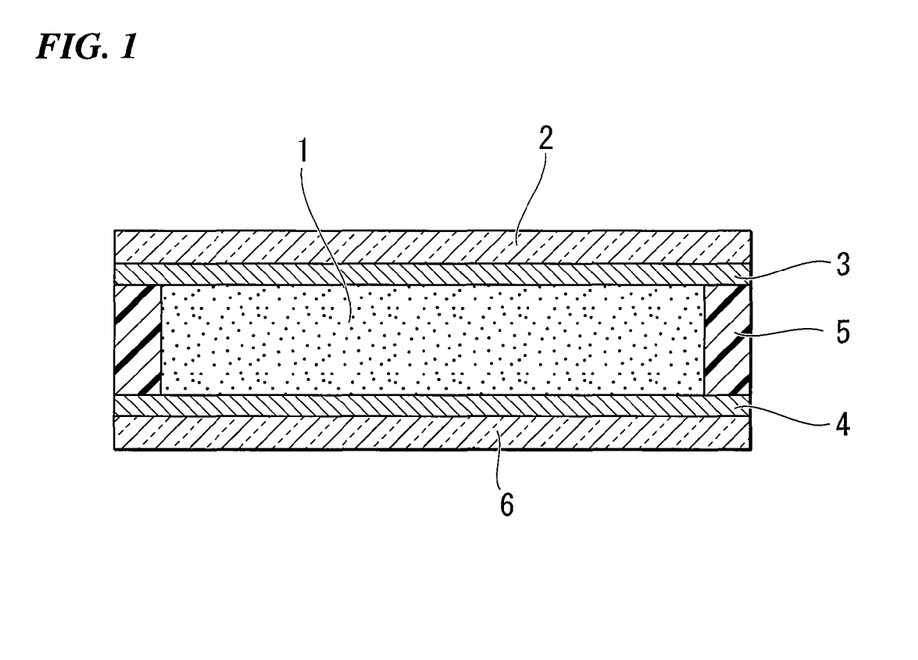
FIG. 1 shows a schematic representation of a display device utilizing an ion conductor according to the present invention.

The configuration of this electrochemical device is shown in FIG. 1. Assuming that the upper side of FIG. 1 is a screen of the display, 1 represents the ion conductor of the present invention (an electrolytic solution containing a coloring agent is used therein); 2 represents a transparent substrate of glass, plastics, etc.; 3 represents a transparent electrode of ITO, etc.; 4 represents a counter electrode; 5 represents a sealing medium; and 6 represents a counter substrate.

The electrochemical display device of the second system is an electrochemical display device wherein the materials which reversibly change color by an electrochemical oxidation-reduction reaction form a color-developing layer set on the plates of electrodes.

Figure 2:
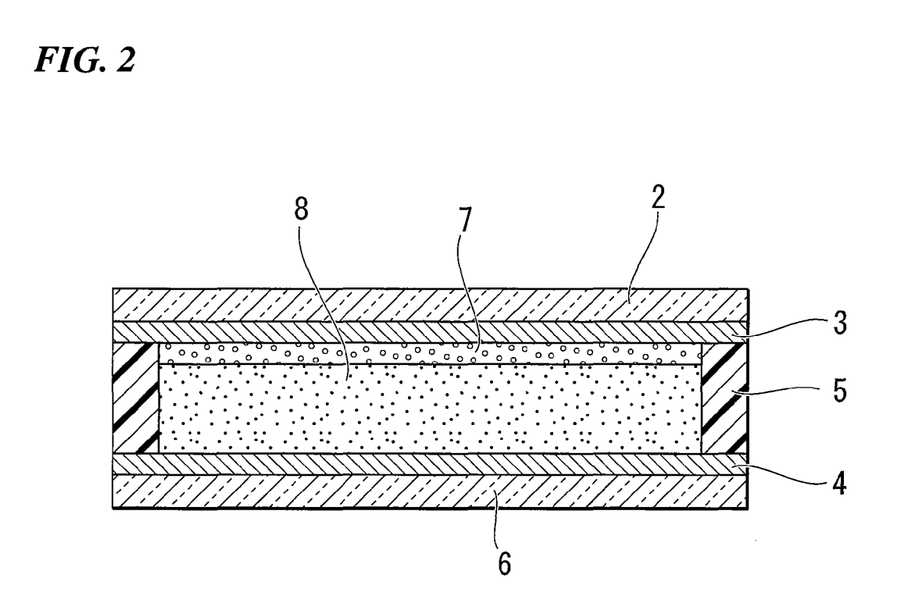
FIG. 2 shows a schematic representation of a display device utilizing an ion conductor according to the present invention.

In this case, it is unnecessary for the electrolytic solution impregnated into the ion conductor to include the materials which reversibly change color by an electrochemical oxidation-reduction reaction. The configuration of this electrochemical device is shown in FIG. 2. Assuming that the upper side of FIG. 2 is a screen of the display, 2 represents a transparent substrate of glass, plastics, etc.; 3 represents a transparent electrode of ITO, etc.; 4 represents a counter electrode; 5 represents a sealing medium; 6 represents a counter substrate; 7 represents a color-developing layer which changes color by an electrochemical oxidation-reduction reaction; and 8 represents an ion conductor (an electrolytic solution containing no color-developing agent is used therein).

(Electrode)

The electrode plate used in the present invention which is located on the side of the screen needs to be transparent. As examples of electrode plates, those formed on the substrates by shaping ITO (indium tin oxide), ATO (antimony-doped tin oxide), TO (tin oxide), ZO (zinc oxide), IZO (indium zinc oxide), FTO (fluorine-doped tin oxide), etc. (which are widely used at present) can be mentioned. However, it is not always necessary for the counter electrode to be transparent. Therefore, electrochemically stable metals such as platinum, gold, silver, copper, bismuth, cobalt, palladium, etc. and carbon materials can be also used.

(Substrate Material)

The substrate material used in the present invention is not particularly limited as long as the surface of the materials used on the screen is smooth; its transmissibility of light is high; and the above-described electrode can be set on the substrate material. For example, a plastic sheet of polyethylene terephthalate, polyester, polycarbonate, etc., a glass board, and the like can be mentioned. In the case of the substrate material used on the side opposite to the screen, its transmissibility of light does not need to be high.

(Sealing Medium)

The sealing medium 5 is used in order to prevent penetration of water, oxygen, or carbon dioxide present in the air into the medium 1 for the electrochemical display device in addition to maintaining a gap between electrodes and, for example, resins (an epoxy resin and acryl resin, etc.) and the like which can be hardened by heat, ultraviolet radiation, etc. and have a gas-barrier property can be mentioned.

(Color-Developing Layer which Changes Color by an Electrochemical Oxidation or Reduction Reaction)

As shown in FIG. 2, the present invention can also provide a display device wherein a color-developing-layer which changes color by an electrochemical oxidation or reduction reaction is placed in contact with an electrode. Such a color-developing layer can be made by using organic compounds and metal compounds. As examples of organic compounds comprising the color-developing layer, polymer materials such as polypyrrole, polyaniline, polyazulene, polythiophene, polyindole, polycarbazole, etc. can be mentioned, but polypyrrole is preferably used because the color of the precipitate is deep and the reversible reaction of coloring and decoloring is excellent. Also, as examples of inorganic compounds comprising the color-developing layer, $WO_3$, $MoO_3$, $V_2O_5$, $Nb_2O_5$, $TiO_2$, $NiO$, $Cr_2O_3$, $MnO_2$, $CoO$, $IrO_2$, etc. can be mentioned. In this system, it is necessary for the color-developing layer, wherein the coloring and decoloring will occur, to be formed on the transparent electrode, which is one of the electrodes on the substrate. When organic compounds are used as the color-developing layer, a membrane of the layer can be made on the transparent electrode by electrolytically or chemically polymerizing monomer materials for the above-described polymer compounds. When the metal compounds are used, the membrane can be made by using known methods such as vacuum deposition, method of electron beam vacuum deposition, sputtering method, etc.

Also, a display device that is the same as FIG. 2 can be produced by coating the transparent electrode with a coating liquid or gel-like product, wherein the above-mentioned organic or inorganic color-developing materials are mixed into binding resins with a supporting electrolyte and solvent. In this case, the color-developing layer can be placed by using a coating method, spin coating, etc.

(Electrochemical Device)

In the present invention, an electrochemical display device can be produced by adding a power supply module, a circuit module and, according to necessity, a sealing layer, a case, or the like to the display device shown in FIG. 1 or 2.

Also, use of the ion conductor of the present invention is not limited to a display device and it can be used suitably as a material for electrochemical devices such as a secondary battery, an electric double layer capacitor, a solar battery, and the like.

EXAMPLES

Hereinafter, the present invention is further demonstrated by using examples. The term "part" represents "part by mass" unless stated otherwise.

Synthesis Example 1

Synthesis of Fine Particles of Organic Polymer)

(Organic Polymer: Polyamide, and Inorganic Compound: Silica)

1.58 parts of 1,6-diaminohexane and 9.18 parts of water glass #3 were added to 81.1 parts of ion-exchanged water. These were stirred for fifteen minutes at 25° C. and a uniform and transparent aqueous solution (B) was obtained. This solution (B) was put in a blender (produced by Osterizer Company) at room temperature, and an organic solution (A) wherein 2.49 parts of adipoyl chloride were dissolved in 44.4 parts of toluene was added dropwise for twenty seconds while mixing at 10000 revolutions per minute. The produced gel-like material was crushed with a spatula and further mixed at 10000 revolutions per minute for forty seconds. The fiber-like product obtained by this procedure was dispersed in a solution, and the solution was filtered under reduced pressure on a piece of filter paper whose pore size was 4 μm by using a Nutsche filter whose diameter was 90 mm. The product on the Nutsche filter was dispersed in 100 parts of methanol. A process of washing was carried out by stirring this with a stirrer for thirty minutes and by filtering under reduced pressure. Successively, the same washing procedure was carried out by using 100 parts of distilled water and a pure white wet cake (wet cake (1)) of fine particles of organic polymer (silica/polyamide), containing water, was obtained by filtering under reduced pressure.

Synthesis Example 2

Synthesis of Fine Particles of Organic Polymer (Organic Polymer: Polyamide, and Inorganic Compound: Aluminum Oxide)

A pure white wet cake (wet cake (2)) of fine particles of organic polymer (aluminum oxide/polyamide), containing water, was obtained by way of the same procedures as in Synthesis Example 1 except that a uniform and transparent aqueous solution (B) obtained by adding 1.58 parts of 1,6-diaminohexane and 2.26 parts of sodium aluminate ($Na_2O$/$Al_2O_3$ molar ratio=1.13) to 81.1 parts of ion-exchanged water and by stirring these for fifteen minutes at room temperature was used.

Synthesis Example 3

Synthesis of Fine Particles of Organic Polymer (Organic Polymer: Polyamide, and Inorganic Compound: Zirconium Oxide)

A pure white wet cake (wet cake (3)) of fine particles of organic polymer (zirconium oxide/polyamide) containing water was obtained by way of the same procedures as in Synthesis Example 1 except that a uniform and transparent aqueous solution (B) obtained by adding 1.58 parts of 1,6-diaminohexane and 3.79 parts of potassium zirconium carbonate ($K_2[Zr(OH)_2(CO_3)_2]$) to 38.5 parts of ion-exchanged water and by stirring these was used.

Synthesis Example 4

Synthesis of Polyamide Containing No Inorganic Compound

A pale yellow wet cake (wet cake (4)) of polyamide, containing water but no ultra-fine particles of inorganic compound was obtained by way of the same procedures as in Synthesis Example 1 except that an aqueous solution (B) wherein 1.18 parts of sodium hydroxide was added instead of water glass #3 was used.

The obtained fine particles of organic polymer were analyzed by the following methods.

(Method of Measuring the Inorganic Compound Content (Ash Content))

Each of the wet cakes of fine particles of organic polymer was completely dried and precisely weighed (mass of fine particle of organic polymer), then, the organic polymer content was completely burnt off by baking at 600° C. for three hours, the mass after baking was measured and considered the mass of ash (=mass of inorganic compound). The inorganic compound content was calculated by using the following formula.

Inorganic compound content (% by mass)=(mass of ash/mass of fine particles of organic polymer)×100

(Measurement of the Particle Diameter of Ultra-Fine Particles of an Inorganic Compound in Fine Particles of an Organic Polymer and Observation of their Dispersion)

Figure 3:
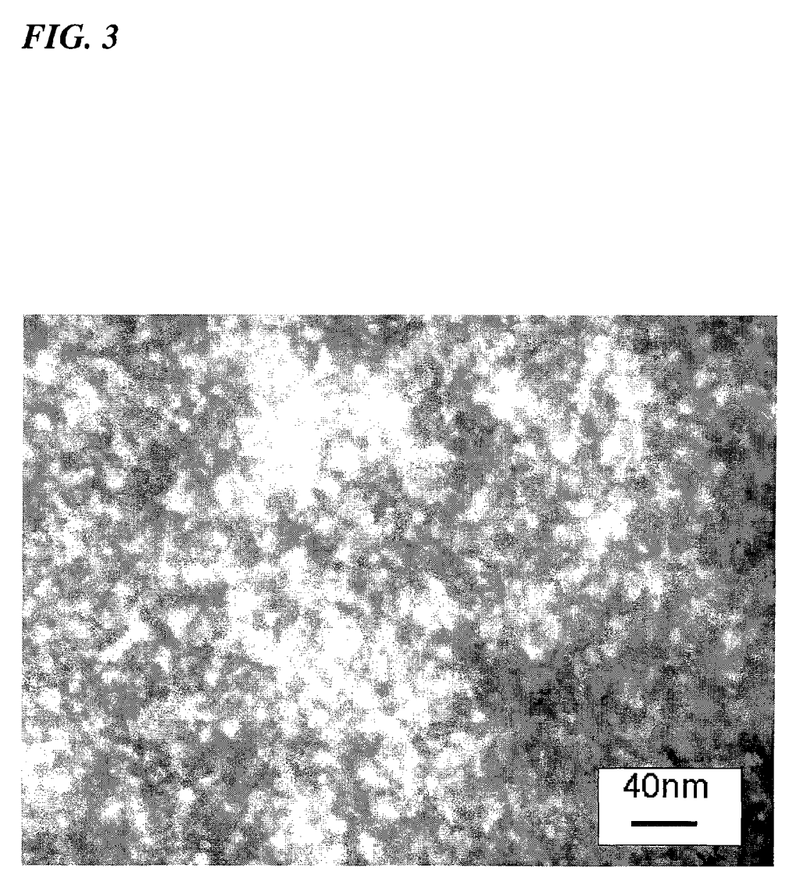
FIG. 3 shows an image by transmission electron microscopy of fine particles of organic polymer (polyamide) including ultra-fine particles of silica.

A thin section of fine particles of an organic polymer about 1 mm thick was obtained by heat-pressing the fine particles of the organic polymer for two hours at 170° C. and 20 MPa/cm². An ultra-thin section about 75 nm thick was made from this by using a microtome. The obtained slice was observed by a transmission electron microscope (JEM-200CX, produced by JEOL Ltd.). It was observed that the inorganic compounds seen as a dark image were finely dispersed in bright organic polymers. FIG. 3 represents an image by the transmission electron microscope of fine particles of the organic polymer (silica/polyamide).

Next, the breadths and lengths of one hundred particles of the inorganic compound were measured based on the image obtained from the transmission electron microscopy, and their arithmetic average value was considered as the average particle diameter. In the fine particles of the organic polymer (silica/polyamide), it was observed that silica, which was found to be sphere-shaped and about 10 nm reticulately (i.e., three-dimensionally), formed a network and was finely dispersed in polyamide. In the fine particles of the organic polymer (aluminum oxide/polyamide), it was observed that aluminum oxide, which was found to have a tabular form about 10 nm stratiformly (i.e., two-dimensionally), formed a network and was finely dispersed in fine particles of the polyamide. On the other hand, in the fine particles of the organic polymer (zirconium oxide/polyamide), each of the particles of zirconium oxide was about 150 nm and was independently dispersed.

(Preparation of an Electrolytic Solution Containing a Color-Developing Agent and Supporting Electrolyte)

An aqueous electrolytic solution and an organic electrolytic solution were prepared by the following methods.

Preparation Example 1

Aqueous Electrolytic Solution (Color-Developing Agent: Bismuth)

An electrolytic solution (1) comprising 20.0 g of water as a solvent, 0.54 g of bismuth oxyperchlorate as a color-developing agent, 0.42 g of a 60% by mass solution of perchloric acid as a supporting electrolyte and 0.28 g of hydroquinone as a reduction-accelerating agent was prepared. This electrolytic solution was transparent and uniform wherein each of the components was completely dissolved in water. The refraction index of water was 1.33 at room temperature.

Preparation Example 2

Organic Electrolytic Solution (Color-Developing Agent: Silver)

An electrolytic solution (2) comprising 20.0 g of acetonitrile as a solvent, 0.71 g of silver bromide as a color-developing agent and 2.30 g of lithium bromide as a supporting electrolyte was prepared. This electrolytic solution was transparent and uniform wherein each of the components was completely dissolved in acetonitrile. The refraction index of acetonitrile was 1.34 at room temperature.

Example 1

About 10 g of the wet cake (1) obtained in Synthesis Example 1 was dispersed in 100 g of ultra-pure water, a treatment of washing was carried out by repeating a filtering process under reduced pressure three times and about 10 g of the wet cake containing ultra-pure water was obtained. After the mass of the obtained wet cake (wet mass) was measured, it was dried at 150° C. for two hours and the mass (dry mass) was measured. The ratio of solid content was calculated from these values by using the following formula.

Ratio of solid content (% by mass)=(dry mass/wet mass)×100

After an amount of the wet cake, whose solid content was estimated at 0.3 g based on this ratio of slid content, was stirred for ten minutes at room temperature in the aqueous electrolytic solution (1) prepared in Preparation Example 1 and dispersed therein, an ion conductor (1a) of the present invention about 700 μm thick containing the aqueous electrolytic solution was produced by filtering on a piece of 4 μm filter paper for five minutes under reduced pressure of 0.02 MPa.

Example 2

An ion conductor (2a) of the present invention was produced by way of the same method as in Example 1 except that the wet cake (2) obtained in Synthesis Example 2 was used instead of the wet cake (1) used in Example 1.

Example 3

An ion conductor (3a) of the present invention was produced by way of the same method as in Example 1 except that the wet cake (3) obtained in Synthesis Example 3 was used instead of the wet cake (1) used in Example 1.

Comparative Example 1

Ion conductor (4a) containing no ultra-fine particles of inorganic compound was produced by way of the same method as in Example 1 except that the wet cake (4) obtained in Synthesis Example 4 was used instead of the wet cake (1) used in Example 1.

Example 4

After washing the wet cake (1) with ultra-pure water was carried out by way of the same method as in Example 1, the obtained wet cake was dispersed in 100 g of acetonitrile and about 10 g of a wet cake whose liquid content was mostly acetonitrile was obtained by repeating a process of filtering under reduced pressure three times. An ion conductor (1b) of the present invention that was about 700 μm thick and contained an organic electrolytic solution was produced from the wet cake by way of the same method as in Example 1 except that the electrolytic solution (2) prepared in Preparation Example 2, wherein acetonitrile was used as a solvent, was used instead of an aqueous electrolytic solution.

Example 5

An ion conductor (2b) of the present invention was produced by way of the same method as in Example 4 except that the wet cake (2) obtained in Synthesis Example 2 was used instead of the wet cake (1) used in Example 4.

Example 6

An ion conductor (3b) of the present invention was produced by way of the same method as in Example 4 except that the wet cake (3) obtained in Synthesis Example 3 was used instead of the wet cake (1) used in Example 4.

Comparative Example 2

An ion conductor (4b) containing no fine particles of inorganic compound was produced by way of the same method as in Example 4 except that the wet cake (4) obtained in Synthesis Example 4 was used instead of the wet cake (1) used in Example 4.

The masses of the ion conductors (1a) to (4a) (mass of cake) were measured. Then, an amount of ultra-pure water that was fifteen times as much of each of their masses of cake was added thereto, and they were washed by dispersing for thirty minutes at room temperature and filtered under reduced pressure. This process was repeated three times, so that the supporting electrolyte, etc. were completely removed and a wet cake containing only ultra-pure water was obtained. This wet cake was dried under reduced pressure at 150° C. for two hours and the mass (dry mass) was measured. The degree of impregnation with the electrolytic solution (i.e. the amount of electrolytic solution impregnated) with respect to the fine particles of the organic polymer was calculated from these values by using the formula below. Also, the ion conductors (1b) to (4b) were treated by way of the same procedure of washing with acetonitrile, and then, their degrees of impregnation with the electrolytic solutions with respect to fine particles of organic polymer were calculated.

Degree of impregnation with electrolytic solution (% by mass)={(mass of cake−dry mass)/dry mass}×100

The ionic conductivity of each ion conductor at 25° C. was measured based on the AC impedance method by using an impedance analyzer 1260 (produced by Toyo Technica Inc.) and sample holders for measuring liquid.

The ion conductors were set on a standard black board and the reflectivity (%) (based on a standard white board) of the ion conductors in the vertical direction under a scattering-light source were measured by using an evaluation system for a display device (DMS-5000, produced by autronic-MELCHERS).

Physical properties of the fine particles of the organic polymer obtained in Synthetic Examples 1 to 4 are shown in Table 1. The specific surface areas of fine particles of the organic polymer measured by way of the following method are also shown in Table 1.

(Measurement of Specific Surface Area)

Each of the obtained wet cakes was completely dried by drying at 170° C. for two hours in a hot air dryer, about 0.2 g of this dried sample was placed in an automatic gas absorption measurement device (Autosorb 1C, produced by Yuasa-ionics company), by using nitrogen gas as a gas for absorption, an amount of the gas absorption was measured in five points in the range of 0.05 to 0.3 of relative pressure ($P/P_o$) based on the method of measuring specific surface area of JIS Z8830, and the specific surface area ($m^2/g$) of each sample was measured by way of the BET method from the values.

TABLE 1

|  | Synthesis Example 1 Wet cake (1) | Synthesis Example 2 Wet cake (2) | Synthesis Example 3 Wet cake (3) | Synthesis Example 4 Wet cake (4) |
| --- | --- | --- | --- | --- |
| Inorganic Compound | $SiO_2$ | $Al_2O_3$ | $ZrO_2$ | — |
| Inorganic Content (% by mass) | 60 | 40 | 45 | 0 |
| Particle diameter of inorganic compound (nm) | 10 | 10 | 150 | — |
| Specific surface area ($m^2/g$) | 123 | 74 | 38 | <1 |
| Inorganic compound-dispersing structure | Three-dimensional network | Two-dimensional network | Independent particle | — |

TABLE 2

|  | Example 1 Ion conductor (1a) | Example 2 Ion conductor (2a) | Example 3 Ion conductor (3a) | Comparative Example 1 Ion conductor (4a) |
| --- | --- | --- | --- | --- |
| Inorganic Compound | $SiO_2$ | $Al_2O_3$ | $ZrO_2$ | — |
| Degree of impregnation with electrolytic solution (% by mass) | 810 | 720 | 640 | 250 |
| Ion conductivity (S/cm) | $1.6 \times 10^{-1}$ | $1.1 \times 10^{-1}$ | $9.8 \times 10^{-2}$ | $8.9 \times 10^{-4}$ |
| Reflectivity of display medium (%) | 96 | 92 | 95 | 79 |

Physical properties of the ion conductors (1a) to (4a) impregnated with the aqueous electrolytic solution (1) are shown in Table 2 and physical properties of the ion conductors (1b) to (4b) impregnated with the organic electrolytic solution (2) are shown in Table 3.

TABLE 3

|  | Example 4 Ion conductor (1b) | Example 5 Ion conductor (2b) | Example 6 Ion conductor (3b) | Comparative Example 2 Ion conductor (4b) |
| --- | --- | --- | --- | --- |
| Inorganic Compound | $SiO_2$ | $Al_2O_3$ | $ZrO_2$ | — |
| Degree of impregnation with electrolytic solution (% by mass) | 790 | 630 | 610 | 240 |
| Ion conductivity (S/cm) | $3.0 \times 10^{-3}$ | $2.4 \times 10^{-3}$ | $2.2 \times 10^{-3}$ | $1.2 \times 10^{-4}$ |
| Reflectivity of display medium (%) | 95 | 90 | 94 | 73 |

The ion conductors of the present invention can be impregnated with the quite large volume of the electrolytic solution and even if subjected to pressure, the electrolytic solution never leaked from the ion conductors. On the other hand, an amounts of the electrolytic solution impregnated into the ion conductors (4a) and (4b) of Comparative Examples 1 and 2 wherein the fine particles of the organic polymer included no ultra-fine particles of inorganic compound were less and the electrolytic solution leaked when the ion conductors were subjected to pressure.

As shown in Tables 2 and 3, the ion conductors (1a) to (3a) and (1b) to (3b) could be impregnated with 600% by mass or more of the electrolytic solutions with respect to the fine particles of the organic polymer irrespective of an aqueous or organic electrolytic solution and without a leak of the electrolytic solutions. Also, every ion conductivity indicated a high value of $2 \times 10^{-3}$ S/cm or more. On the other hand, the capacity to be impregnated with the electrolytic solution was less and the ion conductivity was low in each of the ion conductors (4a) and (4b) including no ultra-fine particle of inorganic compound.

The amount of the electrolytic solution impregnated into a wet cake (4′), which was produced by mixing 50% by mass of ZnO powder whose average particle diameter was about 2 μm in the process of synthesizing the wet cake (4), was 230% by mass with respect to the fine particles of the organic polymer and this was almost the same as that of the wet cake (4) which included no inorganic compound. Therefore, this reveals that the inclusion of the particles of the inorganic compound on a micrometer scale hardly contributes to an increase in the amount of electrolytic solution impregnated and that it is important for the fine particles of organic polymer to include ultra-fine particles of the inorganic compound of 500 nm or less.

(Production of an Electrochemical Display Device and Display Apparatus)

Example 7

Both sides of the ion conductor (1a) obtained in Example 1 were placed between ITO electrodes (produced by E.H.C Co., Ltd.; surface resistivity: 10Ω/□) having a glass substrate 700 μm thick such that the actual surfaces of the electrodes faced inward and that the thickness became 600 μm, and a display device was produced by sealing the outside with an epoxy resin. The display apparatus was produced by connecting the ITO electrodes of this display device to a power supply module having a function generator. Display properties as described above were evaluated by using this display apparatus.

Example 8

A display device and display apparatus were produced by way of the same method as in Example 7 except that the ion conductor (2a) obtained in Example 2 was used instead of the ion conductor (1a) and the display properties were evaluated.

Example 9

A display device and display apparatus were produced by way of the same method as in Example 7 except that the ion conductor (3a) obtained in Example 3 was used instead of the ion conductor (1a), and the display properties were evaluated.

Example 10

A display device and display apparatus were produced by way of the same method as in Example 7 except that the ion conductor (1b) obtained in Example 4 was used instead of the ion conductor (1a), and the display properties were evaluated.

Example 11

A display device and display apparatus were produced by way of the same method as in Example 7 except that the ion conductor (2b) obtained in Example 5 was used instead of the ion conductor (1a), and the display properties were evaluated.

Example 12

A display device and display apparatus were produced by way of the same method as in Example 7 except that the ion conductor (3b) obtained in Example 6 was used instead of the ion conductor (1a), and the display properties were evaluated.

Comparative Example 3

Aqueous Electrolytic Solution

A display device and display apparatus were produced by way of the same method as in Example 7 except that the ion conductor (4a) obtained in Comparative Example 1 including no ultra-fine particles of inorganic compound was used instead of the ion conductor (1a), and the display properties were evaluated.

Comparative Example 4

Organic Electrolytic Solution

A display device and display apparatus were produced by way of the same method as in Example 7 except that the ion conductor (4b) obtained in Comparative Example 2 including no ultra-fine particles of inorganic compound was used instead of the ion conductor (1a), and the display properties were evaluated.

Comparative Example 5

Plain White Paper

The same display apparatus as in Example 7 including an aqueous electrolytic solution was produced except that several pieces of plain white paper impregnated with the electrolytic solution (1) wherein water was used as a solvent was used by layering them so that the thickness was 600 μm instead of using the fine particles of the organic polymer.

Comparative Example 6

A resin spacer was placed between two pieces of electrodes so that a gap between the electrodes was 600 μm, the outside was sealed with an epoxy resin leaving two openings. The two openings were sealed with an epoxy resin after the electrolytic solution (1) was poured into one of the openings so that the only electrolytic solution was encapsulated therein, and a display apparatus wherein the aqueous electrolytic solution was encapsulated in a liquid state was produced by way of the same method as in Example 7 except that a sheet of wet cake (1) obtained in Synthesis Example 1 was set in a lower side of counter substrate 6 in FIG. 1 (side opposite to the screen).

Comparative Example 7

An electro-deposition display apparatus was produced by using a mixture of polyvinylidene fluoride, $LiBF_4$ and $AgClO_4$ in accordance with Example 4 in patent document 3.

The electrochemical display devices produced in the above examples and comparative examples were evaluated with respect to the following items.

(Measurement and Calculation of White Reflectivity of a Display Device)

Each display device was set on a standard black board and the reflectivity (white reflectivity) was measured by using an evaluation system for a display device (DMS-5000, produced by autronic-MELCHERS) where no voltage was applied.

(Observation of Texture)

The texture of each display device was evaluated by eye observation on a scale from A to C, depending on how close its texture was to that of plain white paper. "A" representing "close to plain white paper"; "B" representing "slightly close to plain white paper"; and "C" representing "clearly different from plain white paper".

(Measurement and Calculation of Contrast Ratio)

Each display device was continuously exposed to an electric field of −1.5 V/mm for two seconds. As a result, the side of the screen of the display device became black as the metal precipitated. In this condition, the application of the electric field was terminated and reflectivity (black reflectivity) of the obtained black display was measured and calculated by way of the same method as that of white reflectivity as described above. The ratio of the calculated white reflectivity and black reflectivity was considered as contrast ratio. If the contrast ratio is 10:1 or more, it can be considered that the display device has a sufficient display property. Also, when the display apparatuses in the state of black display were continuously exposed to an electric field of +1.5 V/mm for two seconds, in all of those in Examples 7 to 12, decoloring occurred and they returned to the state of the initial white reflectivity (Evaluation of Leakage Resistance of Electrolytic Solution)

The leakage resistance was evaluated on a scale from A to C from the perspective of whether the electrolytic solution inside leaked or not when destroying the display device. "A" representing "the electrolytic solution never leaks"; "B" representing "slightly leaks"; and "C" representing "leaks".

The obtained display properties of the display apparatuses are shown in Table 4.

TABLE 4

|  | Ion conductor | White reflectivity (%) | Texture | Contrast ratio | Leakage resistance of electrolytic solution |
|---|---|---|---|---|---|
| Example 7 | Ion conductor (1a) | 64 | A | 12:1 | A |
| Example 8 | Ion conductor (2a) | 63 | A | 11:1 | A |
| Example 9 | Ion conductor (3a) | 63 | A | 12:1 | A |
| Example 10 | Ion conductor (1b) | 62 | A | 12:1 | A |
| Example 11 | Ion conductor (2b) | 62 | A | 11:1 | A |
| Example 12 | Ion conductor (3b) | 61 | A | 12:1 | A |
| Comparative Example 3 | Ion conductor (4a) | 38 | B | 3:1 | B |
| Comparative Example 4 | Ion conductor (4b) | 36 | B | 3:1 | B |
| Comparative Example 5 | Paper impregnated with electrolytic solution | 38 | B | 2:1 | C |
| Comparative Example 6 | Electrolytic solution | 31 | C | 3:1 | C |
| Comparative Example 7 | Macromolecular electrolyte | 67 | C | 5:1 | A |

As shown in Table 4, it was revealed that their white reflectivity of the display apparatuses produced by using the ion conductors of the present invention was as high as 60% or more. It was also revealed that they were close to a texture of paper and indicated high contrast ratio because their ion conductors had high ion conductivity. Compared to Comparative Example 7 wherein a polymer solid electrolyte was used as a medium for a display device, they were also excellent in coloring and decoloring speed (response speed) and their degree of blackness when colored. In Comparative Example 7, the white reflectivity was relatively high, but the texture was quite different from that of paper. On the other hand, in Comparative Example 5, ionic migration did not occur sufficiently in the electrolytic solution because materials inside the device did not have a sufficient capacity to be impregnated with the electrolytic solution. Consequently, uniform and smooth coloring-decoloring did not occur over the entire surface of the screen of the apparatus and the contrast ratio was quite low. Also, in Comparative Example 6, the high reflectivity, which is inherent of the sheet of the wet cake deployed on the back side, excessively decreased because incident light traveled back and forth between the two pieces of glass substrate, two layers of ITO electrodes and the electrolytic solution.

As described above, it was revealed that the ion conductors of the present invention have excellent properties as an ion conductor and also as a medium for an electrochemical display device.

INDUSTRIAL APPLICABILITY

The ion conductivity of the ion conductors of the present invention is quite high and the ion conductors of the present invention can be used as materials for an electrochemical apparatus such as a secondary battery, an electrical double layer capacitor, a solar battery, etc.

Also, the ion conductors of the present invention can be used suitably as an ion conductor for a reflective electrochemical display device because their clarity and texture are quite close to paper.

The invention claimed is:

1. An ion conductor comprising:
    a fine particle of an organic polymer including 20 to 80% by mass of a ultra-fine particle of an inorganic compound; and
    an electrolytic solution impregnated into the fine particles of the organic polymer,
    wherein the ultra-fine particle of the inorganic compound has an average particle diameter of 500 nm or less, and the fine particle of the organic polymer has a specific surface area measured by the BET method of 30 m$^2$/g or more.

2. The ion conductor according to claim 1, wherein a degree of impregnation with the electrolytic solution with respect to the fine particle of the organic polymer is 500 to 2000% by mass.

3. The ion conductor according to claim 1, wherein the fine particle of the organic polymer has an average particle diameter of 1 to 1000 µm.

4. The ion conductor according to claim 1, wherein the fine particle of the organic polymer has an average breadth of 20 µm or less and an average aspect ratio of 5 to 20.

5. The ion conductor according to claim 1, wherein the inorganic compound is at least one inorganic compound selected from the group consisting of a metal oxide, a metal hydroxide, and a metal carbonate.

6. The ion conductor according to claim 1, wherein the organic polymer is at least one organic polymer selected from the group consisting of a polyamide, a polyurethane, and a polyurea.

7. The ion conductor according to claim 5, wherein the fine particle of the organic polymer is obtained by an interfacial polycondensation reaction caused from a contact between
    an organic solution (A) containing at least one compound selected from the group consisting of a dicarboxylic acid dihalide, a dihaloformate and a phosgene, and an organic solvent, and
    an aqueous solution (B) containing a metal compound of at least one alkali metal element with other metal elements, a diamine, and water.

8. An electrochemical display device comprising:
    two electrode plates;
    the ion conductor according to claim 1 maintained between the two electrode plates; and
    a material which changes color reversibly by an electrochemical oxidation-reduction reaction in the ion conductor.

9. The electrochemical display device according to claim 8, wherein the material which changes color reversibly by the electrochemical oxidation-reduction reaction is a color-developing agent included in the ion conductor.

10. The electrochemical display device according to claim 8, wherein the material which changes color reversibly by the electrochemical oxidation-reduction reaction forms a color-developing layer set on the electrode plates.

* * * * *